United States Patent
Jia et al.

(10) Patent No.: US 12,117,541 B2
(45) Date of Patent: Oct. 15, 2024

(54) POSITIONING METHOD AND DEVICE, AND SERVER AND SYSTEM

(71) Applicant: ZTE Corporation, Shenzhen (CN)

(72) Inventors: Yunxiang Jia, Shenzhen (CN); Yunhui Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 1186 days.

(21) Appl. No.: 16/760,510

(22) PCT Filed: Nov. 2, 2018

(86) PCT No.: PCT/CN2018/113708
§ 371 (c)(1),
(2) Date: Apr. 30, 2020

(87) PCT Pub. No.: WO2019/086000
PCT Pub. Date: May 9, 2019

(65) Prior Publication Data
US 2021/0199814 A1 Jul. 1, 2021

(30) Foreign Application Priority Data
Nov. 2, 2017 (CN) .......................... 201711065138.X

(51) Int. Cl.
*G01S 19/45* (2010.01)
*G01S 19/07* (2010.01)
(Continued)

(52) U.S. Cl.
CPC .............. *G01S 19/45* (2013.01); *G01S 19/07* (2013.01); *G01S 19/40* (2013.01); *G01S 19/485* (2020.05); *G01S 19/42* (2013.01); *G01S 19/51* (2013.01)

(58) Field of Classification Search
CPC .......... G01S 19/07; G01S 19/45; G01S 19/51; G01S 19/40; G01S 19/42; G01S 19/485
(Continued)

(56) References Cited

U.S. PATENT DOCUMENTS

| 9,154,742 B2 * | 10/2015 | Ota | ........................ G01S 5/0018 |
| 10,338,228 B2 * | 7/2019 | Ashjaee | .................. G01C 11/02 |

(Continued)

FOREIGN PATENT DOCUMENTS

| CN | 101217723 A | 7/2008 |
| CN | 101498582 A | 8/2009 |

(Continued)

OTHER PUBLICATIONS

Chinese Office Action for corresponding application 201711065138. X: Report dated Dec. 11, 2020.
(Continued)

*Primary Examiner* — Chuong P Nguyen
(74) *Attorney, Agent, or Firm* — CANTOR COLBURN LLP

(57) ABSTRACT

Provided is a positioning method, including following steps: current location information is determined, and the current location information is sent to a positioning server; identification information of a guidepost and guidepost location information of the guidepost sent by the positioning server are received; and an image of a current location is acquired, the image is matched with the identification information of the guidepost, and in response to a success in matching the image with the identification information of the guidepost, corrected current location information is obtained according to the guidepost location information, or the current location information and the guidepost location information.

14 Claims, 9 Drawing Sheets

(51) Int. Cl.
*G01S 19/40* (2010.01)
*G01S 19/48* (2010.01)
*G01S 19/42* (2010.01)
*G01S 19/51* (2010.01)

(58) Field of Classification Search
USPC ............ 342/357.44, 357.28, 357.34, 357.23, 342/357.25
See application file for complete search history.

(56) References Cited

U.S. PATENT DOCUMENTS

| | | | |
|---|---|---|---|
| 10,613,231 B2* | 4/2020 | Ashjaee | G01S 19/45 |
| 11,092,444 B2* | 8/2021 | Stess | G01C 21/3837 |
| 11,487,020 B2* | 11/2022 | Browning | G01S 19/07 |
| 11,619,745 B2* | 4/2023 | Luo | G01S 19/06 |
| | | | 342/357.59 |
| 2013/0107038 A1* | 5/2013 | Ota | H04N 7/18 |
| | | | 348/135 |
| 2017/0008521 A1 | 1/2017 | Braunstein | |
| 2017/0307763 A1* | 10/2017 | Browning | G01S 19/07 |
| 2018/0321388 A1* | 11/2018 | Max | G01S 19/45 |
| 2018/0340788 A1* | 11/2018 | Liu | G01S 19/40 |
| 2020/0158887 A1* | 5/2020 | Lee | G01S 19/485 |
| 2021/0063162 A1* | 3/2021 | Moskowitz | G01C 21/28 |
| 2021/0199437 A1* | 7/2021 | Breed | G06N 3/02 |

FOREIGN PATENT DOCUMENTS

| | | | | |
|---|---|---|---|---|
| CN | 102854490 A | 1/2013 | | |
| CN | 103649683 A | 3/2014 | | |
| CN | 106304335 A | 1/2017 | | |
| CN | 106352867 A | 1/2017 | | |
| CN | 108051836 A | 5/2018 | | |
| EP | 1060569 B1 | 12/2000 | | |
| JP | 2001307121 A | 11/2001 | | |
| KR | 20130012629 A | 2/2013 | | |
| KR | 101569919 B1 | 11/2015 | | |
| WO | 9937036 | 7/1999 | | |
| WO | 2016148237 A1 | 9/2016 | | |
| WO | WO-2017120595 A2 * | 7/2017 | ............ | B60W 30/00 |
| WO | WO-2020049089 A1 * | 3/2020 | ............ | G01C 21/30 |

OTHER PUBLICATIONS

Chinese Office Action for corresponding application 201711065138. X: Report dated Jul. 5, 2021.
Chinese Search Report for corresponding application 201711065138. X: Report dated Dec. 11, 2020.
Chinese Office Action for corresponding application 201711065138. X; Report dated Nov. 2, 2021.
Korean Office Action for corresponding application 10-2020-7015778 filed Jun. 2, 2020; Dated Nov. 3, 2021.
International Search Report for corresponding application PCT/CN2018/113708 filed Nov. 2, 2018; Mail date Jan. 31, 2019.

* cited by examiner

POSITIONING METHOD AND DEVICE, AND SERVER AND SYSTEM

CROSS-REFERENCE TO RELATED APPLICATIONS

This is a National Stage Application, filed under 35 U.S.C. 371, of International Patent Application No. PCT/CN2018/113708, filed on Nov. 2, 2018, which claims priority to Chinese patent application No. 201711065138.X filed on Nov. 2, 2017, contents of both of which are incorporated herein by reference in their entireties.

TECHNICAL FIELD

The present disclosure relates to positioning technologies, for example, to a positioning method, device, server and system.

BACKGROUND

At present, an outdoor positioning system mainly depends on a global positioning system (GPS) as a main positioning means and estimates a current location by receiving GPS satellite signals and according to the GPS signals from multiple satellites.

However, a positioning accuracy of the GPS can only reach a range of 10 meters, which limits an application range of the outdoor positioning system. Meanwhile, it is increasingly difficult to meet future requirements on an outdoor positioning accuracy (such as a driverless car, a drone and an automatic delivery truck). In addition, the GPS also has disadvantages of a decreased positioning accuracy in rainy days, a failure to operate normally due to high building blockage and no signal in tunnels and the like.

SUMMARY

The present disclosure provides a positioning method, device, server and system, so as to improve a positioning accuracy.

The present disclosure provides a positioning method. The positioning method includes following steps: current location information is determined, and the current location information is sent to a positioning server; identification information of a guidepost and guidepost location information of the guidepost sent by the positioning server are received; and an image of a current location is acquired, the image is matched with the identification information of the guidepost, and in response to a success in matching the image with the identification information of the guidepost, corrected current location information is obtained according to the guidepost location information, or the current location information and the guidepost location information.

The present disclosure further provides a positioning method. The positioning method includes following steps: current location information is received; and a guidepost library is searched according to the current location information, and identification information of a guidepost and guidepost location information of the guidepost are sent, where the guidepost is found in the guidepost library and matches with the current location information.

The present disclosure further provides a positioning method. The positioning method includes following steps: identification information of a guidepost is acquired according to an image of a current location, and guidepost location information of the guidepost is determined according to current location information; and the identification information of the guidepost and the guidepost location information of the guidepost is sent to a positioning server.

The present disclosure further provides a positioning method. The positioning method includes following steps: identification information of a guidepost is acquired according to an image of a current location, and the identification information of the guidepost is sent to a positioning server; guidepost location information of the guidepost sent by the positioning server is received; and corrected current location information is obtained according to the guidepost location information, or current location information and the guidepost location information.

The present disclosure further provides a positioning method. The positioning method includes following steps: identification information of a guidepost is received; and a guidepost library is searched according to the identification information of the guidepost, and guidepost location information of the guidepost found in the guidepost library is sent.

The present disclosure further provides a positioning device, including a visual processing unit, a first communication unit and a visual sensor.

The visual processing unit is configured to determine current location information.

The first communication unit is configured to send the current location information to a positioning server, and receive identification information of a guidepost and guidepost location information of the guidepost sent by the positioning server.

The visual sensor is configured to acquire an image of a current location.

The visual processing unit is further configured to match the image with the identification information of the guidepost, and in response to a success in matching the image with the identification information of the guidepost, obtain corrected current location information according to the guidepost location information, or the current location information and the guidepost location information.

The present disclosure further provides a positioning server, including a guidepost processing unit and a second communication unit.

The second communication unit is configured to receive current location information.

The guidepost processing unit is configured to search a guidepost library according to the current location information.

The second communication unit is further configured to send identification information of a guidepost and guidepost location information of the guidepost, where the guidepost is found by the guidepost processing unit and matches with the current location information.

The present disclosure further provides a positioning device, including a visual processing unit, a first communication unit and a visual sensor.

The visual sensor is configured to acquire an image of a current location.

The visual processing unit is configured to acquire identification information of a guidepost according to the image of the current location, and determine guidepost location information of the guidepost according to current location information.

The first communication unit is configured to send the identification information of the guidepost and the guidepost location information of the guidepost to a positioning server.

The present disclosure further provides a positioning device, including a visual processing unit, a communication unit and a visual sensor.

The visual sensor is configured to acquire an image of a current location.

The visual processing unit is configured to acquire identification information of a guidepost according to the image of the current location.

The communication unit is configured to send the identification information of the guidepost to a positioning server, and receive guidepost location information of the guidepost sent by the positioning server.

The visual processing unit is further configured to obtain corrected current location information according to the guidepost location information, or current location information and the guidepost location information.

The present disclosure further provides a positioning server, including a guidepost processing unit and a communication unit.

The communication unit is configured to receive identification information of a guidepost.

The guidepost processing unit is configured to search a guidepost library according to the identification information of the guidepost.

The communication unit is further configured to send guidepost location information of the guidepost found by the guidepost processing unit.

The present disclosure further provides a positioning system, which includes the positioning device described above and the positioning server described above.

The present disclosure further provides a computer-readable storage medium, storing computer-executable instructions configured to execute the positioning method described above.

In the present disclosure, the positioning method includes following steps: the current location information is determined, and the current location information is sent to the positioning server; the identification information of the guidepost and the guidepost location information of the guidepost sent by the positioning server are received; and the image of the current location is acquired, the image is matched with the identification information of the guidepost, and in response to a success in matching the image with the identification information of the guidepost, the corrected current location information is obtained according to the guidepost location information, or the current location information and the guidepost location information. In the present disclosure, the positioning device may combine the current location information with guidepost information provided by the positioning server to improve a positioning accuracy of the positioning device.

In an embodiment, the positioning device may send the corrected guidepost location information to the positioning server, so that the positioning server integrates guidepost location information reported by multiple positioning devices. Therefore, an accuracy of the guidepost in the guidepost library is improved.

In an embodiment, the positioning device may actively report the guidepost location information, so that the positioning server integrates guidepost location information reported by multiple positioning devices. Therefore, the guidepost library is enriched and the accuracy of the guidepost in the guidepost library is improved.

In an embodiment, under the condition that a GPS of the positioning device is unavailable or comes across an error, the guidepost location information may be obtained through the positioning server, which improves the positioning accuracy of the positioning device.

DETAILED DESCRIPTION

The steps shown in the flowcharts of the drawings may be performed by a computer system including a group of computer-executable instructions. Moreover, although logical sequences are shown in the flowcharts, in some cases, the steps shown or described may be performed in sequences different from those described herein.

Figure 1:
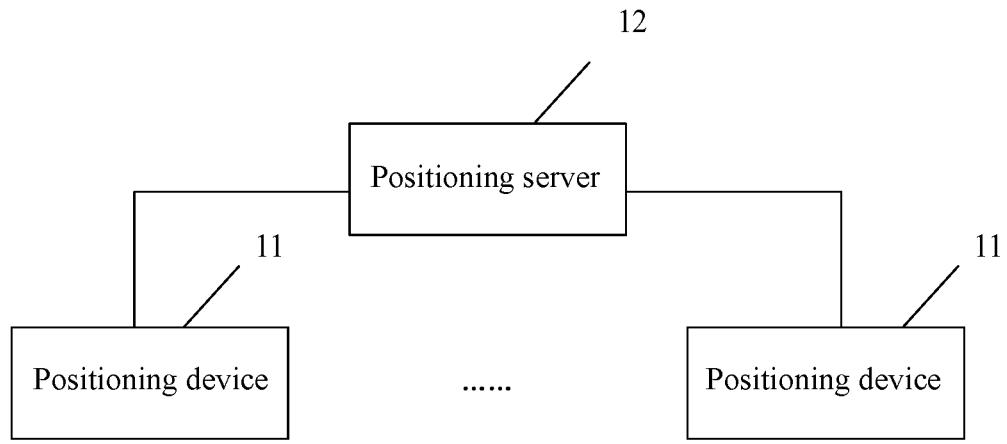
FIG. 1 is a schematic diagram illustrating composition of a positioning system according to an embodiment of the present disclosure.

As shown in FIG. 1, a positioning system in an embodiment of the present disclosure includes a positioning device 11 and a positioning server 12. The positioning device 11 may also be referred to as a front-end positioning device and may be deployed on a mobile apparatus that requires a positioning service, such as a driverless car or a drone. The positioning server 12 may be used as a map server and disposed on a cloud server. The positioning device 11 is communicatively connected to the positioning server 12.

Figure 2:
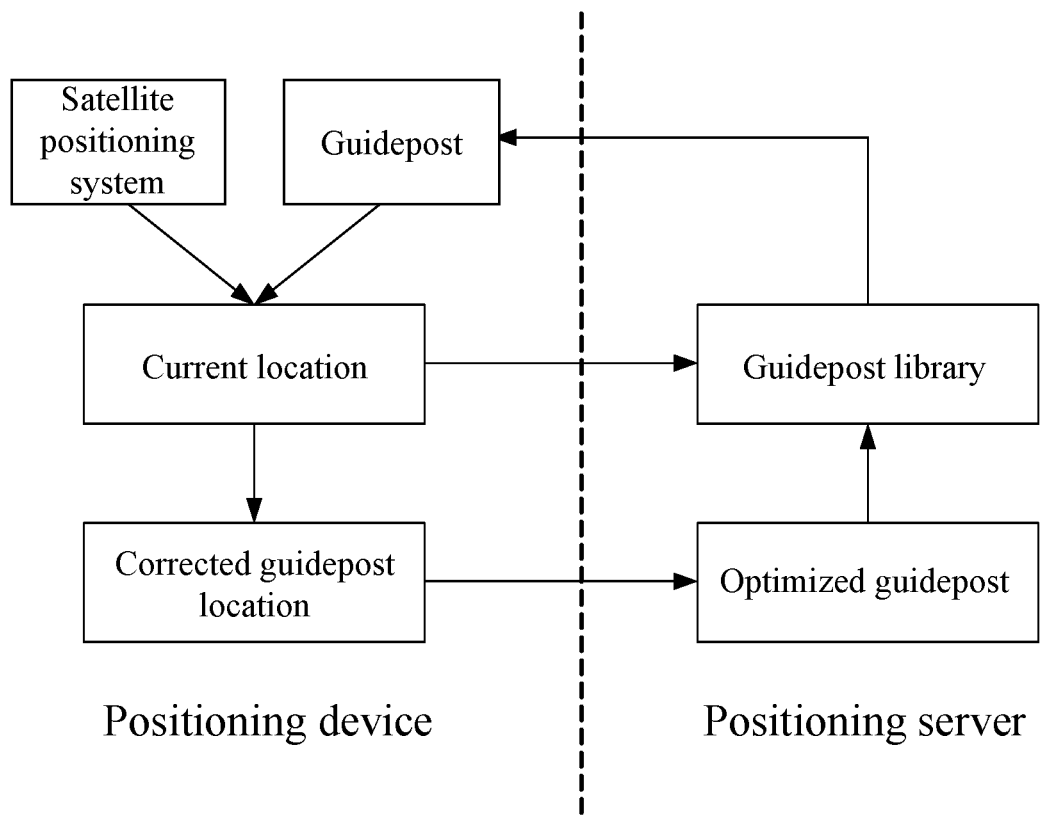
FIG. 2 is a schematic diagram illustrating a positioning implementation of a positioning system according to an embodiment of the present disclosure.

As shown in FIG. 2, the positioning device 11 may continuously report a calculated current location to the positioning server 12, and the positioning server 12 performs location retrieval in a guidepost library, and if a guidepost near the positioning device 11 exists, sends guidepost information to the positioning device 11. At an initial stage of system operation, the guidepost library may not include a known guidepost of the location. In this case, the positioning device 11 may perform positioning by using an original satellite positioning system (such as a GPS system or BeiDou), extract a guidepost from an image, integrate location information provided by a third-party positioning system while calculating a location of the guidepost, so as to optimize a positioning accuracy and report guidepost location information of the guidepost to the positioning server 12. If the positioning server 12 retrieves the corresponding guidepost after receiving the location reported by the positioning device 11, the positioning server 12 sends the guidepost location information to the positioning device 11, so that the positioning device 11 may match the guidepost with the image for positioning and integrate the location information provided by the third-party positioning system to optimize the positioning accuracy.

It should be noted that the preceding satellite positioning system may also be another third-party positioning system that can provide location information, which is not limited in the present disclosure.

The guidepost information may include identification information of the guidepost and the guidepost location information of the guidepost, where the guidepost location information includes a location of the guidepost and may also include an error estimate.

In the embodiment of the present disclosure, based on positioning of the satellite positioning system, according to the guidepost location information sent by the positioning server and an auxiliary image positioning technology, by integrating a visual positioning technology and a positioning technology of the satellite positioning system, the positioning accuracy is improved. Meanwhile, the location of the guidepost is corrected and sent to the positioning server, and the positioning server integrates guidepost location information reported by multiple positioning devices to further improve the accuracy of the guidepost. The preceding process is continuously repeated, which may continuously improve the positioning accuracy.

In the embodiments of the present disclosure, there are three main cases.

A First Case

Figure 3:
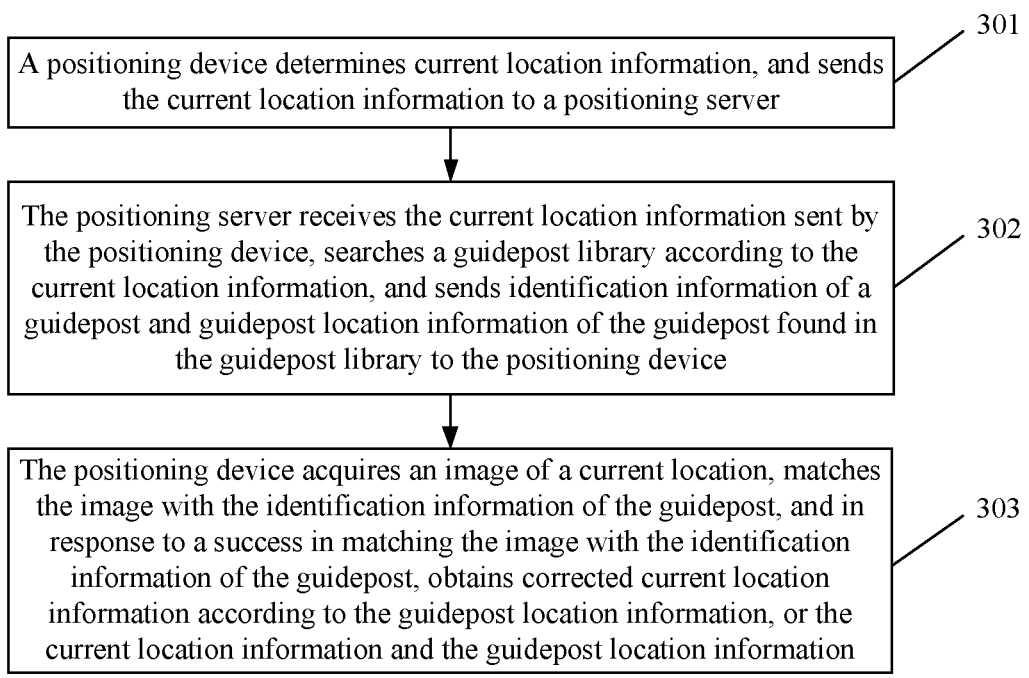
FIG. 3 is a flowchart of a positioning method in a first case according to an embodiment of the present disclosure.

A positioning device obtains guidepost location information from a positioning server according to current location information, and the positioning device is configured to correct the current location information. Referring to FIG. 3, a positioning method includes steps 301, 302 and 303.

In step 301, the positioning device determines the current location information, and sends the current location information to the positioning server.

In step 302, the positioning server receives the current location information sent by the positioning device, searches a guidepost library according to the current location information, and sends identification information of a guidepost and guidepost location information of the guidepost to the positioning device, where the guidepost is found in the guidepost library and matches with the current location information.

In step 303, the positioning device acquires an image of a current location, matches the image with the identification information of the guidepost, and in response to a success in matching the image with the identification information of the guidepost, obtains corrected current location information according to the guidepost location information, or the current location information and the guidepost location information.

In this embodiment, the positioning device may combine the current location information with the guidepost location information provided by the positioning server to improve the positioning accuracy.

The current location information is location information of the positioning device itself. In an implementation manner, the step of determining the current location information includes: acquiring location information sent by a satellite positioning system as the current location information; or acquiring the location information sent by the satellite positioning system, and determining the current location information by combining visual positioning information with the location information sent by the satellite positioning system.

The satellite positioning system may be a GPS, a BeiDou system or the like, and may also be other third-party positioning systems that may provide location information.

The visual positioning information is obtained by calculating the image of the current position by the positioning device, where the image of the current position is obtained by a visual sensor.

In an implementation manner, the step of obtaining the corrected current location information according to the guidepost location information includes: determining a relative location between the current location and the guidepost, and obtaining the corrected current location information according to the relative location and the guidepost location information.

In an implementation manner, the step of obtaining the corrected current location information according to the current location information and the guidepost location information includes: determining the relative location between the current location and the guidepost, determining current estimated location information according to the relative location and the guidepost location information, and obtaining the corrected current location information according to the current location information and the current estimated location information.

The corrected current location information may be obtained according to the current location information and the current estimated location information by using a non-linear optimization manner.

In an implementation manner, the step of determining the relative location between the current location and the guidepost includes: acquiring depth information of images of the current location and a location change relation of the images, and obtaining the relative location between the current location and the guidepost according to the depth information and the location change relation.

The depth information of the images may be obtained by the visual sensor and a visual processing unit in the positioning device. The visual sensor may adopt a binocular camera. The visual processing unit may perform triangulation through a known baseline of the binocular camera to acquire depth information of a guidepost point. The visual sensor may also adopt a monocular camera plus an inertial measurement unit (IMU), and scale information of the monocular camera is restored through an IMU integration technology. In addition, a Red-Green-Blue-Depth (RGBD) camera may also be adopted to directly obtain the depth information from a depth sensor.

In this embodiment, a visual positioning technology is integrated with a third-party positioning technology, thereby improving the positioning accuracy.

In this embodiment, the identification information of the guidepost may include a picture of the guidepost, such as a picture of a traffic sign, a picture of a roadside shop and building. At this time, the step of matching the image of the current location with the identification information of the guidepost refers to comparing the image of the current location with the picture of the guidepost. If the image of the current location is consistent with the picture of the guidepost, the matching succeeds. If the image of the current location is inconsistent with the picture of the guidepost, the matching fails. The identification information of the guidepost may include text information of the guidepost, such as a street name and a name of the roadside shop. At this time, the step of matching the image of the current location with the identification information of the guidepost refers to comparing the image of the current location with the text information of the guidepost. If the image of the current location includes the text information, the matching succeeds. If the image of the current location does not include the text information, the matching fails.

Figure 4:
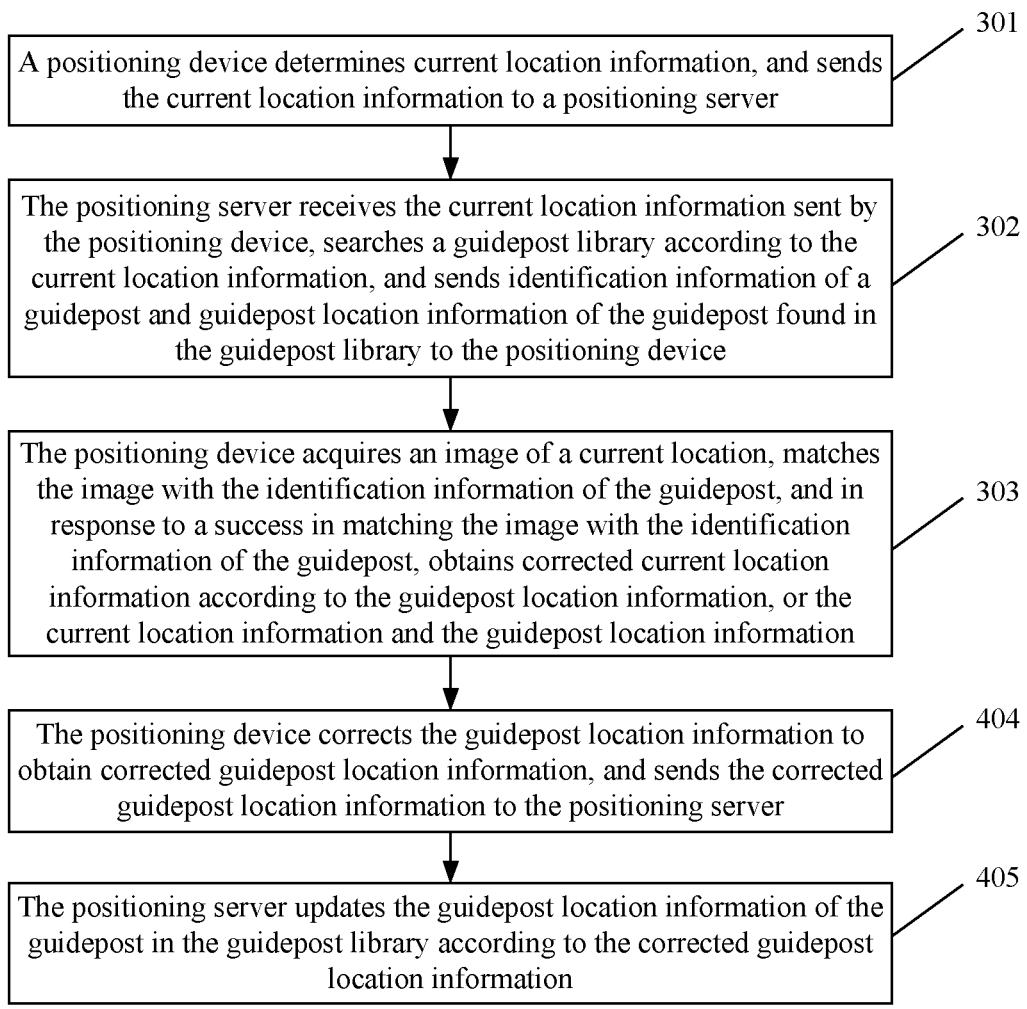
FIG. 4 is a flowchart of a positioning method in a first case according to another embodiment of the present disclosure.

In an implementation manner, after the success in matching the image with the identification information of the guidepost, the positioning device may report corrected guidepost location information to the positioning server. As shown in FIG. 4, after step 303, the positioning method includes steps 404 and 405.

In step 404, the positioning device corrects the guidepost location information to obtain the corrected guidepost location information, and sends the corrected guidepost location information to the positioning server.

In step 405, the positioning server updates the guidepost location information of the guidepost in the guidepost library according to the corrected guidepost location information.

In this embodiment, the positioning device sends the corrected guidepost location information to the positioning server, so that the positioning server integrates guidepost information reported by multiple positioning devices. Therefore, the accuracy of the guidepost is improved.

In an implementation manner, the step of correcting the guidepost location information to obtain the corrected guidepost location information includes: determining the relative location between the current location and the guidepost, and obtaining the corrected guidepost location information according to the relative location and the corrected current location information.

In an implementation manner, the positioning server updates the guidepost location information of the guidepost in the guidepost library according to the corrected guidepost location information by using the non-linear optimization manner.

A Second Case

A positioning device actively reports guidepost location information for a positioning server to store into a guidepost library. This case generally occurs in an initial state where the guidepost library of the positioning server includes no related guidepost information and the positioning device uploads the guidepost information to the guidepost library.

Figure 5:
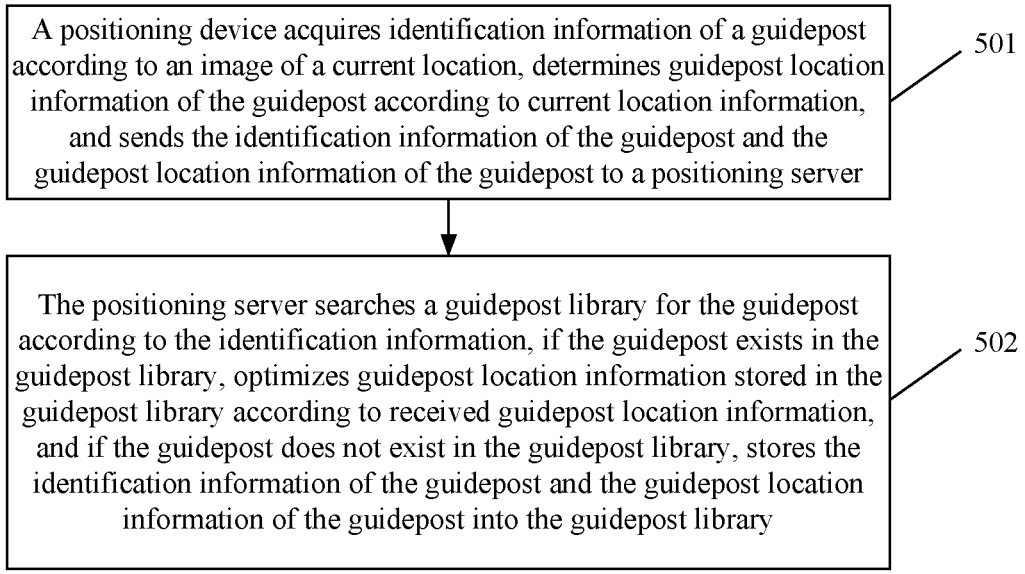
FIG. 5 is a flowchart of a positioning method in a second case according to an embodiment of the present disclosure.

Referring to FIG. 5, a positioning method includes steps 501 and 502.

In step 501, the positioning device acquires identification information of a guidepost according to an image of a current location, determines guidepost location information of the guidepost according to current location information, and sends the identification information of the guidepost and the guidepost location information of the guidepost to the positioning server.

In step 502, the positioning server receives the identification information of the guidepost and the guidepost location information of the guidepost sent by the positioning device, searches the guidepost library for the guidepost according to the identification information, if the guidepost exists in the guidepost library, updates guidepost location information stored in the guidepost library according to the received guidepost location information, and if the guidepost does not exist in the guidepost library, stores the identification information of the guidepost and the guidepost location information of the guidepost into the guidepost library.

In this embodiment, the positioning device sends guidepost information to the positioning server, so that the positioning server integrates guidepost information reported by multiple positioning devices, further improving an accuracy of the guidepost.

In an implementation manner, before the positioning device determines the guidepost location information of the guidepost according to the current location information, the method further includes following steps: the positioning device acquires location information sent by a satellite positioning system as the current location information; or the positioning device acquires the location information sent by the satellite positioning system, and determines the current location information by combining visual positioning information with the location information sent by the satellite positioning system.

In an implementation manner, the step of determining the guidepost location information of the guidepost according to the current location information includes: determining a relative location between the current location and the guidepost, and determining the guidepost location information according to the relative location and the current location information.

In an implementation manner, the step of determining the relative location between the current location and the guidepost includes: acquiring depth information of images of the current location and a location change relation of the images, and obtaining the relative location between the current location and the guidepost according to the depth information and the location change relation.

In an implementation manner, the guidepost location information stored in the guidepost library is updated according to the received guidepost location information by using a non-linear optimization manner.

A Third Case

A positioning device obtains guidepost location information from a positioning server according to identification information of a guidepost, to correct current location information. This case generally occurs when a satellite positioning system is unavailable or comes across an error, and a loop is performed by detecting the guidepost for correcting current wrong location information.

Figure 6:
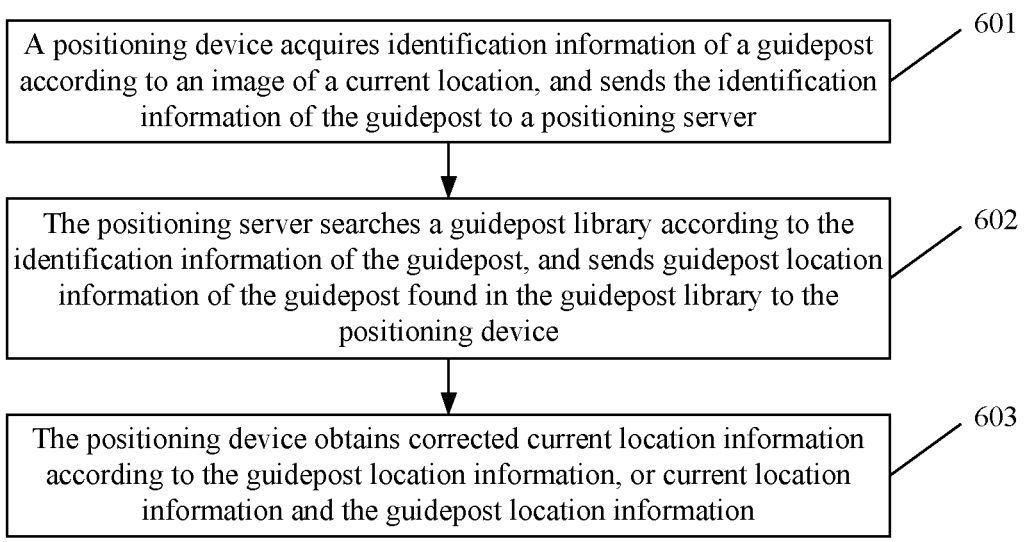
FIG. 6 is a flowchart of a positioning method in a third case according to an embodiment of the present disclosure.

Referring to FIG. 6, a positioning method includes steps 601, 602 and 603.

In step 601, the positioning device acquires the identification information of the guidepost according to an image of a current location, and sends the identification information of the guidepost to the positioning server.

In step 602, the positioning server searches a guidepost library according to the identification information of the guidepost, and sends the guidepost location information of the guidepost found in the guidepost library to the positioning device.

In step 603, the positioning device obtains corrected current location information according to the guidepost location information, or the current location information and the guidepost location information.

In this embodiment, when the satellite positioning system is unavailable or comes across the error, location information may be obtained through the positioning server according to the identification information of the guidepost, which improves a positioning accuracy of the positioning device.

The images of the guidepost are different according to the change of day and night. A positioning device may carry time information when sending guidepost information to a positioning server, and the positioning server creates identification information corresponding to different time for each guidepost.

In an implementation manner, the positioning server may set a certain life cycle for each guidepost. When a certain guidepost has not been updated for a long time or has not been observed many times, the guidepost will be deleted after it reaches an upper limit of its life cycle. This can solve the case where a guidepost is replaced or the location of the guidepost is moved due to road construction or relocation.

In an implementation manner, the identification information includes information of a traffic sign. The positioning device may perform training by using a picture of the traffic sign so as to identify the traffic sign from the picture.

The positioning system in the embodiment of the present disclosure is formed on the basis of the existing satellite positioning system, and by combining machine vision, a big data analysis, deep learning and the like. The positioning system in the embodiment of the present disclosure is a positioning system with continuous learning and continuous optimization of accuracy, which improves an accuracy of a traditional positioning method.

The following description is separately provided for the positioning device and the positioning server.

Figure 7:
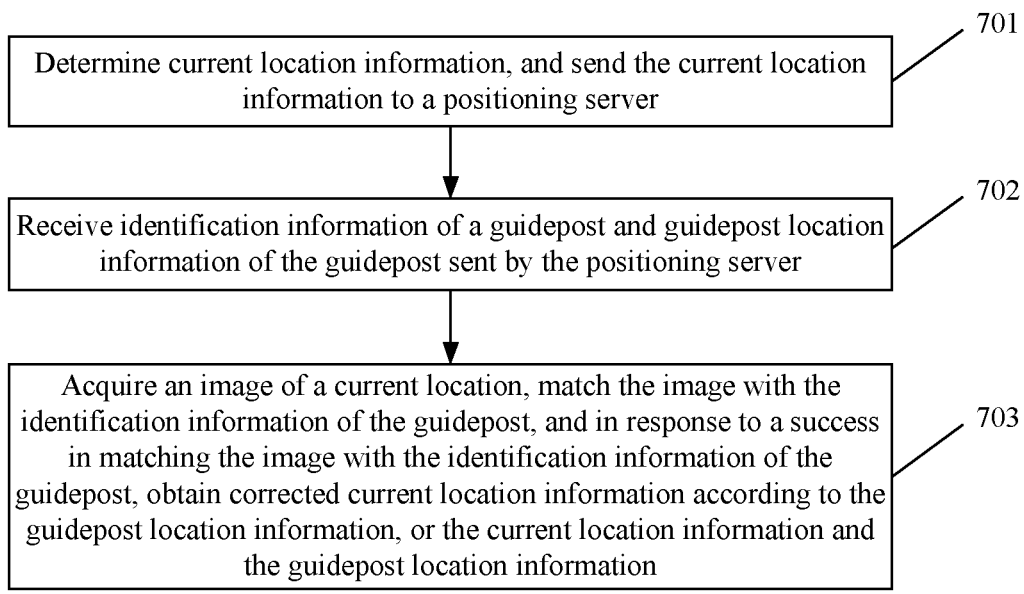
FIG. 7 is a flowchart of a positioning method applied to a positioning device according to an embodiment of the present disclosure.

As shown in FIG. 7, a positioning method according to an embodiment of the present disclosure is provided, which is applied to a positioning device. The positioning method includes steps 701, 702 and 703.

In step 701, current location information is determined and sent to a positioning server.

In step 702, identification information of a guidepost and guidepost location information of the guidepost sent by the positioning server are received.

In step 703, an image of a current location is acquired, the image is matched with the identification information of the guidepost, and in response to a success in matching the image with the identification information of the guidepost, corrected current location information is obtained according to the guidepost location information, or the current location information and the guidepost location information.

In this embodiment, the positioning device may combine the current location information with the guidepost location information provided by the positioning server to obtain the corrected current location information, so as to improve a positioning accuracy.

In an implementation manner, the step in which the current location information is determined includes following steps: location information sent by a satellite positioning system is acquired as the current location information; or the location information sent by the satellite positioning system is acquired, and the current location information is determined by combining visual positioning information with the location information sent by the satellite positioning system.

In an implementation manner, the step in which the corrected current location information is obtained according to the guidepost location information includes following steps: a relative location between the current location and the guidepost is determined, and the corrected current location information is obtained according to the relative location and the guidepost location information.

In an implementation manner, the step in which the corrected current location information is obtained according to the current location information and the guidepost location information includes following steps: the relative location between the current location and the guidepost is determined, current estimated location information is determined according to the relative location and the guidepost location information, and the corrected current location information is obtained according to the current location information and the current estimated location information.

In this embodiment, a visual positioning technology is integrated with a third-party positioning technology, thereby improving the positioning accuracy.

In an implementation manner, the step in which the relative location between the current location and the guidepost is determined includes following steps: depth information of images of the current location and a location change relation of the images are acquired, and the relative location between the current location and the guidepost is obtained according to the depth information and the location change relation.

In an implementation manner, after the image of the current location is acquired and matched with the identification information of the guidepost, and the image is successfully matched with the identification information of the guidepost, the method further includes following steps: the guidepost location information is corrected to obtain corrected guidepost location information; and the corrected guidepost location information is sent to the positioning server.

In this embodiment, the positioning device sends the corrected guidepost location information to the positioning server, so that the positioning server integrates guidepost location information reported by multiple positioning devices. Therefore, an accuracy of the guidepost is improved.

In an implementation manner, the step in which the guidepost location information is corrected to obtain the corrected guidepost location information includes following steps: the relative location between the current location and the guidepost is determined, and the corrected guidepost location information is obtained according to the relative location and the corrected current location information.

In an implementation manner, when the corrected guidepost location information is sent to the positioning server, the method further includes a following step: current time information is sent to the positioning server.

Figure 8:
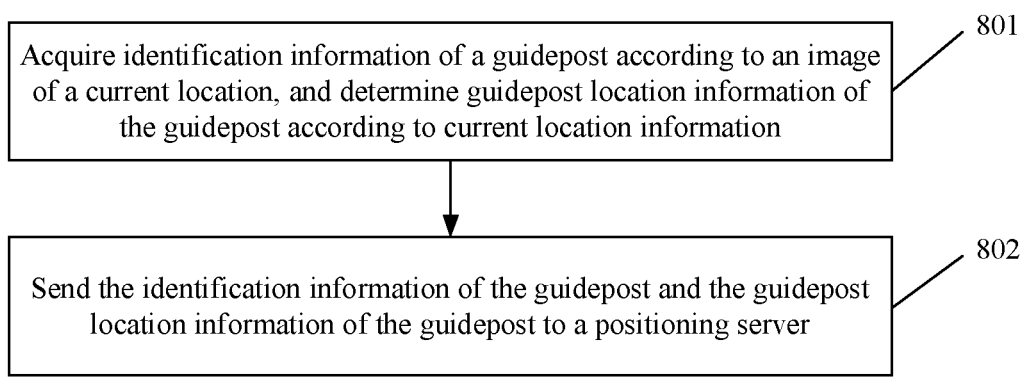
FIG. 8 is a flowchart of a positioning method applied to a positioning device according to another embodiment of the present disclosure.

As shown in FIG. 8, a positioning method according to another embodiment of the present disclosure is provided, which is applied to a positioning device. The positioning method includes steps 801 and 802.

In step 801, identification information of a guidepost is acquired according to an image of a current location, and guidepost location information of the guidepost is determined according to current location information.

In step 802, the identification information of the guidepost and the guidepost location information of the guidepost are sent to a positioning server.

In this embodiment, the positioning device sends the identification information of the guidepost and the guidepost location information of the guidepost to the positioning server, so that the positioning server integrates guidepost location information reported by multiple positioning devices. Therefore, an accuracy of the guidepost is improved.

In an implementation manner, before the guidepost location information of the guidepost is determined according to the current location information, the method further includes following steps: location information sent by a satellite positioning system is acquired as the current location information; or the location information sent by the satellite positioning system is acquired, and the current location information is determined by combining visual positioning information with the location information sent by the satellite positioning system.

In an implementation manner, the step in which the guidepost location information of the guidepost is determined according to the current location information includes following steps: a relative location between the current location and the guidepost is determined, and the guidepost location information is determined according to the relative location and the current location information.

Figure 9:
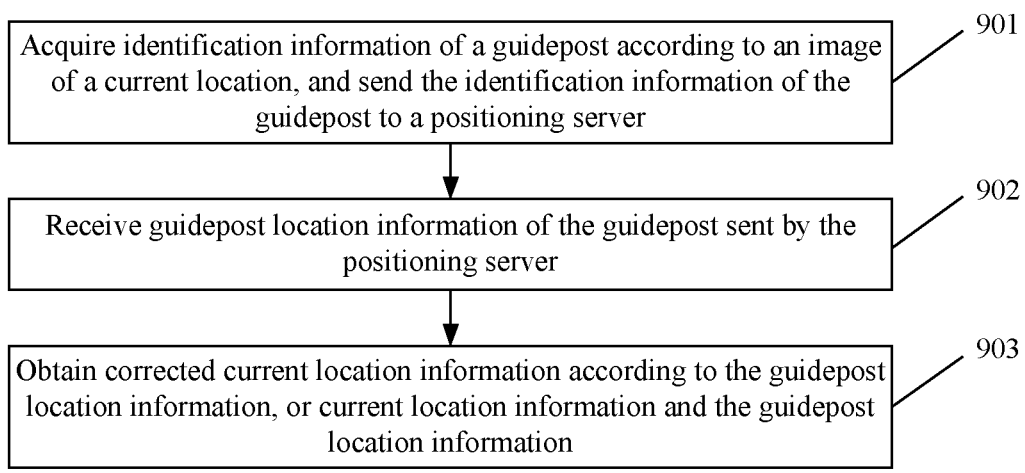
FIG. 9 is a flowchart of a positioning method applied to a positioning device according to another embodiment of the present disclosure.

As shown in FIG. 9, a positioning method according to another embodiment of the present disclosure is provided, which is applied to a positioning device. The positioning method includes steps 901, 902 and 903.

In step 901, identification information of a guidepost is acquired according to an image of a current location, and the identification information of the guidepost is sent to a positioning server.

In step 902, guidepost location information of the guidepost sent by the positioning server is received.

In step 903, corrected current location information is obtained according to the guidepost location information, or current location information and the guidepost location information.

In this embodiment, the guidepost location information may be obtained through the positioning server according to the identification information of the guidepost to obtain the corrected current location information, so as to improve a positioning accuracy of the positioning device.

In an implementation manner, before the corrected current location information is obtained according to the current location information and the guidepost location information, the method further includes following steps: location information sent by a satellite positioning system is acquired as the current location information; or the location information sent by the satellite positioning system is acquired, and the current location information is determined by combining visual positioning information with the location information sent by the satellite positioning system.

In an implementation manner, the step in which the corrected current location information is obtained according to the guidepost location information includes following steps: a relative location between the current location and the guidepost is determined, and the corrected current location information is obtained according to the relative location and the guidepost location information.

In an implementation manner, the step in which the corrected current location information is obtained according to the current location information and the guidepost location information includes following steps: the relative location between the current location and the guidepost is determined, current estimated location information is determined according to the relative location and the guidepost location information, and the corrected current location information is obtained according to the current location information and the current estimated location information.

Figure 10:
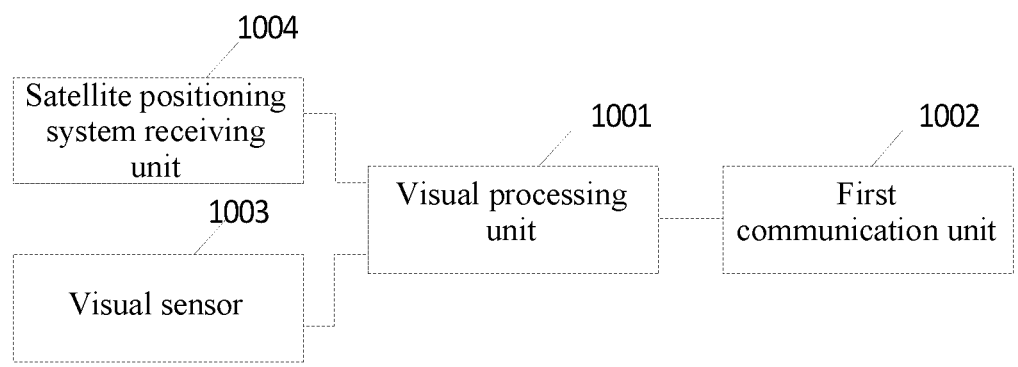
FIG. 10 is a schematic diagram illustrating composition of a positioning device according to an embodiment of the present disclosure.

As shown in FIG. 10, a positioning device according to an embodiment of the present disclosure includes a visual processing unit 1001, a first communication unit 1002 and a visual sensor 1003, and may further include a satellite positioning system receiving unit 1004.

In an embodiment, the visual processing unit 1001 is configured to determine current location information; the first communication unit 1002 is configured to send the current location information to a positioning server, and receive identification information of a guidepost and guidepost location information of the guidepost sent by the positioning server; the visual sensor 1003 is configured to acquire an image of a current location; and the visual processing unit 1001 is further configured to match the image with the identification information of the guidepost, and in response to a success in matching the image with the identification information of the guidepost, obtain corrected current location information according to the guidepost location information, or the current location information and the guidepost location information.

In this embodiment, the positioning device may combine the current location information with the guidepost location information provided by the positioning server to obtain the corrected current location information, so as to improve a positioning accuracy.

In practical applications, the visual processing unit 1001 may be implemented by a processor, the first communication unit 1002 may be implemented by a radio frequency module, and the visual sensor 1003 may adopt a binocular camera, a monocular camera plus an IMU, an RGBD camera or the like. The satellite positioning system receiving unit 1004 may adopt a GPS receiving module, a BeiDou satellite receiving module or the like.

In an implementation manner, the satellite positioning system receiving unit 1004 is configured to acquire location information sent by a satellite positioning system; and the visual processing unit 1001 is configured to take the location information sent by the satellite positioning system as the current location information, or determine the current location information by combining visual positioning information with the location information sent by the satellite positioning system.

In an implementation manner, the visual processing unit 1001 is configured to determine a relative location between the current location and the guidepost, and obtain the corrected current location information according to the relative location and the guidepost location information.

In an implementation manner, the visual processing unit 1001 is configured to determine the relative location between the current location and the guidepost, determine current estimated location information according to the relative location and the guidepost location information, and obtain the corrected current location information according to the current location information and the current estimated location information.

In an implementation manner, the visual processing unit 1001 is further configured to: after the success in matching the image with the identification information of the guidepost, correct the guidepost location information to obtain corrected guidepost location information; and the first communication unit 1002 is further configured to send the corrected guidepost location information to the positioning server.

In an implementation manner, the visual processing unit 1001 is configured to determine the relative location between the current location and the guidepost, and obtain the corrected guidepost location information according to the relative location and the corrected current location information.

In this embodiment, the positioning device sends the corrected guidepost location information to the positioning server, so that the positioning server integrates guidepost location information reported by multiple positioning devices. Therefore, an accuracy of the guidepost is improved.

In an implementation manner, the first communication unit 1002 is further configured to send current time information to the positioning server when sending the corrected guidepost location information to the positioning server.

In another embodiment, the visual sensor 1003 is configured to acquire an image of a current location; the visual processing unit 1001 is configured to acquire identification information of a guidepost according to the image of the current location, and determine guidepost location information of the guidepost according to current location information; and the first communication unit 1002 is configured to send the identification information of the guidepost and the guidepost location information of the guidepost to a positioning server.

In an implementation manner, the satellite positioning system receiving unit 1004 is configured to acquire location information sent by a satellite positioning system; and the visual processing unit 1001 is further configured to take the location information sent by the satellite positioning system as the current location information, or determine the current location information by combining visual positioning information with the location information sent by the satellite positioning system.

In an implementation manner, the visual processing unit 1001 is configured to determine a relative location between the current location and the guidepost, and determine the guidepost location information according to the relative location and the current location information.

In this embodiment, the positioning device sends the identification information of the guidepost and the guidepost location information of the guidepost to the positioning server, so that the positioning server integrates guidepost location information reported by multiple positioning devices. Therefore, an accuracy of the guidepost is improved.

In another embodiment, the visual sensor 1003 is configured to acquire an image of a current location; the visual processing unit 1001 is configured to acquire identification information of a guidepost according to the image of the current location; the first communication unit 1002 is configured to send the identification information of the guidepost to a positioning server, and receive guidepost location information of the guidepost sent by the positioning server; and the visual processing unit 1001 is further configured to obtain corrected current location information according to the guidepost location information, or current location information and the guidepost location information.

In an implementation manner, the satellite positioning system receiving unit 1004 is configured to acquire location information sent by a satellite positioning system; and the visual processing unit 1001 is further configured to take the location information sent by the satellite positioning system as the current location information, or determine the current location information by combining visual positioning information with the location information sent by the satellite positioning system.

In an implementation manner, the visual processing unit 1001 is configured to determine a relative location between the current location and the guidepost, and obtain the corrected current location information according to the relative location and the guidepost location information.

In an implementation manner, the visual processing unit 1001 is configured to determine the relative location between the current location and the guidepost, determine current estimated location information according to the relative location and the guidepost location information, and obtain the corrected current location information according to the current location information and the current estimated location information.

In this embodiment, the guidepost location information may be obtained through the positioning server according to the identification information of the guidepost to obtain the corrected current location information, so as to improve a positioning accuracy of the positioning device.

In the embodiments described above, the visual sensor 1003 refers to an image sensor mainly based on visions, which may be a binocular camera, a depth camera, or a monocular camera plus another sensor such as an IMU.

The visual processing unit 1001 mainly extracts the identification information of the guidepost from the image, positions a relative location of the guidepost, and positions its own location according to the guidepost location information. Continuous positioning and mapping through images may be performed by using a visual simultaneous localization and mapping (vSLAM) algorithm which mainly includes a front-end algorithm and a back-end algorithm. The front-end algorithm is mainly used for calculating inter-frame motion of the images to obtain a relative motion relation between the images. The back-end algorithm is mainly responsible for multi-sensor integration and numerical optimization. The front-end algorithm is mainly to find some feature points from two adjacent frame images and estimate a location change of a camera according to a matching relation of the feature points, which is also referred to as an ego-motion technology. The matching relation of the feature points obtained in the front-end algorithm may be obtained through algorithms such as feature point extraction, feature point matching and outlier removal. In an embodiment, a feature point algorithm may be selected as a feature point extraction algorithm, and ORiented Brief (ORB) is added on a basis of Brief feature points. An outlier removal algorithm adopts a random sample consensus (RANSAC) algorithm. In an embodiment, the ego-motion technology is implemented by using a triangulation technology and a bundle adjustment algorithm.

In the embodiments of the present disclosure, based on this, a traffic sign, a street sign and the like are extracted from the image as the guidepost through a machine learning technology, and meanwhile the relative location of the guidepost is estimated and used in a back-end multi-sensor integration algorithm. In a country, traffic signs are relatively fixed and disposed at relatively obvious positions, so that pictures of the traffic signs may be used for training in advance, and the training may be performed by a traditional support vector machine (SVM) technology or a deep learning technology. The use of the traffic sign as the guidepost not only ensures that a dynamic object and the like that affect the positioning accuracy are not selected as the guidepost but also ensures that the selected guidepost can be observed by various mobile apparatuses (such as vehicles).

Figure 11:
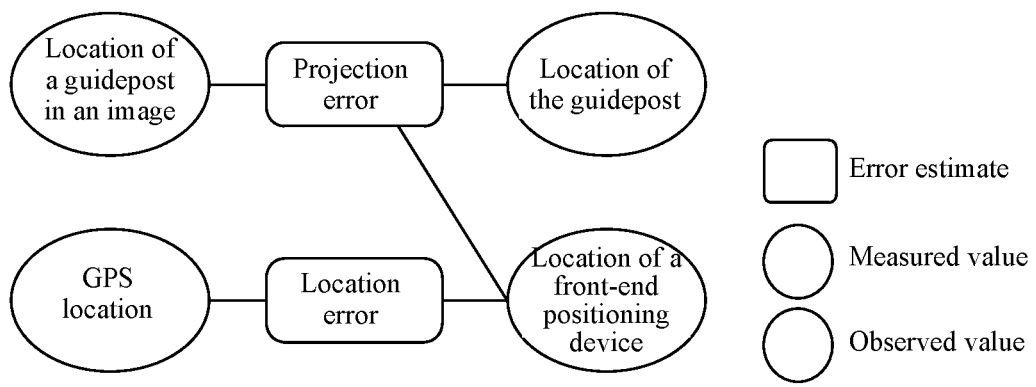
FIG. 11 is a schematic diagram illustrating that a positioning device updates location information according to an embodiment of the present disclosure.

The back-end algorithm is mainly used for multi-sensor integration and mainly to optimize an error between an observed value and a measured value by using a non-linear optimization method. In the embodiments of the present disclosure, an error between location information calculated by a GPS and location information of the positioning device, and projection errors corresponding to a location of the guidepost and a location of the guidepost in the image may be included. A non-linear optimization is to find a gradient direction, to enable the weighted sum of these errors to be minimized, so as to obtain better location information of the positioning device and location information of the guidepost, as shown in FIG. 11.

Figure 12:
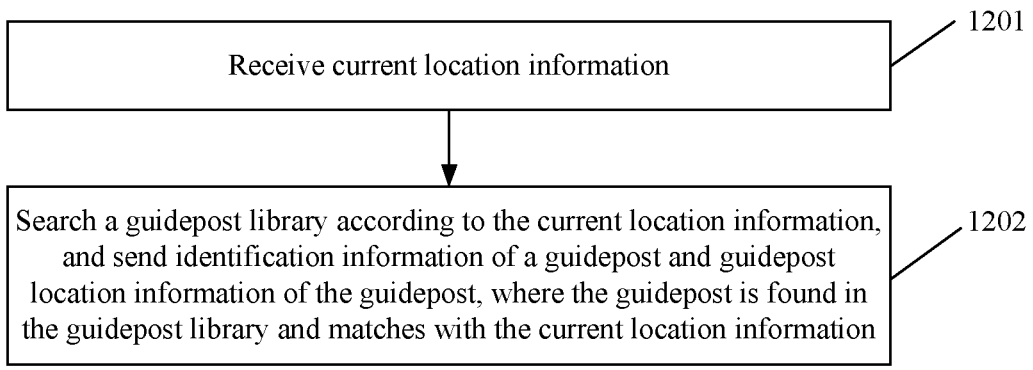
FIG. 12 is a flowchart of a positioning method applied to a positioning server according to an embodiment of the present disclosure.

As shown in FIG. 12, a positioning method according to an embodiment of the present disclosure is provided, which is applied to a positioning server. The positioning method includes steps 1201 and 1202.

In step 1201, current location information is received.

In step 1202, a guidepost library is searched according to the current location information, and identification information of a guidepost and guidepost location information of the guidepost are sent to a positioning device, where the guidepost is found in the guidepost library and matches with the current location information.

In this embodiment, guidepost information may be provided by searching the guidepost library, so as to improve a positioning accuracy.

The current location information sent by the positioning device may be directly or indirectly received, and current location information sent by other terminals may also be received.

The guidepost library is searched according to the current location information, that is, a guidepost near a current location is searched. A search range (for example, a range of 200 meters from a location in the current location information) may be set according to the current location information, and the guidepost is searched for within the search range.

In an implementation manner, the method further includes following steps: corrected guidepost location information is received; and the guidepost location information of the guidepost in the guidepost library is updated according to the corrected guidepost location information.

In this embodiment, the positioning server receives the corrected guidepost location information and integrates multiple pieces of reported guidepost information, which can further improve an accuracy of the guidepost.

In an implementation manner, the method further includes following steps: current time information corresponding to the corrected guidepost location information is received, and the current time information is stored into the guidepost library.

The images of the guidepost are different according to the change of day and night. The positioning device may carry time information when sending guidepost information to the positioning server, and the positioning server creates identification information corresponding to different time for each guidepost to provide 24/7 support.

In an implementation manner, the method further includes following steps: a life cycle of each guidepost in the guidepost library is set; and a guidepost that is not updated within a life cycle and reaches an upper limit of the life cycle is deleted.

In this embodiment, the life cycle of the guidepost is set, which can solve the case where the guidepost is replaced or the location of the guidepost is moved due to road construction or relocation.

Figure 13:
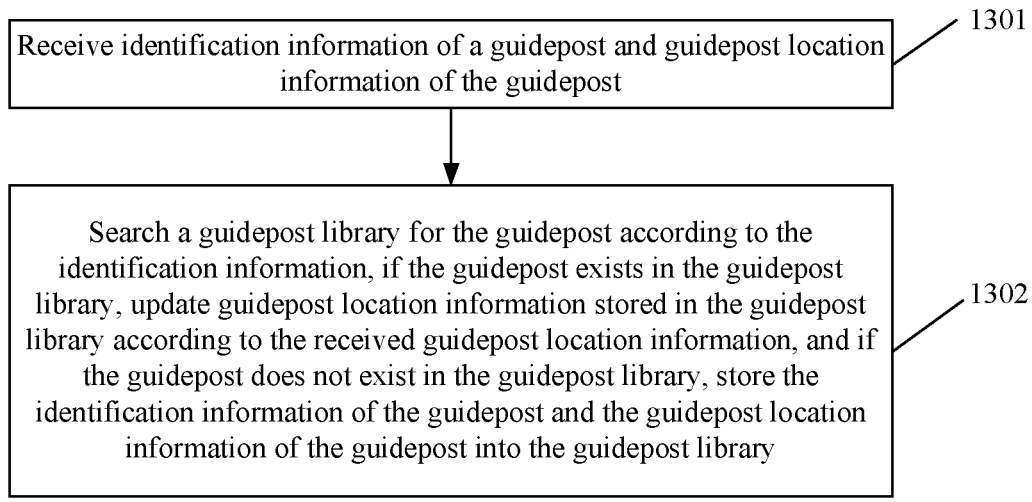
FIG. 13 is a flowchart of a positioning method applied to a positioning server according to another embodiment of the present disclosure.

As shown in FIG. 13, a positioning method according to another embodiment of the present disclosure is provided, which is applied to a positioning server. The positioning method includes steps 1301 and 1302.

In step 1301, identification information of a guidepost and guidepost location information of the guidepost are received.

In step 1302, a guidepost library is searched for the guidepost according to the identification information, if the guidepost exists in the guidepost library, guidepost location information stored in the guidepost library is updated according to the received guidepost location information, and if the guidepost does not exist in the guidepost library, the identification information of the guidepost and the guidepost location information of the guidepost are stored into the guidepost library.

In this embodiment, the positioning server receives guidepost information and stores the guidepost information into the guidepost library, and may further integrate multiple pieces of reported guidepost location information, so as to improve an accuracy of the guidepost.

In an implementation manner, the method further includes following steps: a life cycle of each guidepost in the guidepost library is set; and a guidepost that is not updated within a life cycle and reaches an upper limit of the life cycle is deleted.

In this embodiment, the life cycle of the guidepost is set, which can solve the case where the guidepost is replaced or the location of the guidepost is moved due to road construction or relocation.

Figure 14:
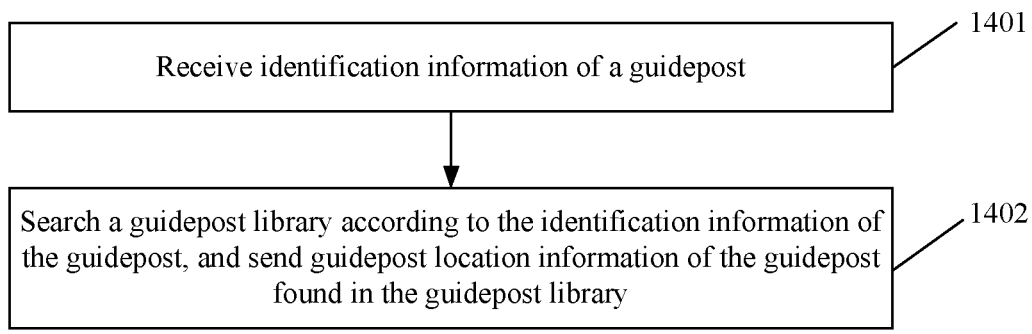
FIG. 14 is a flowchart of a positioning method applied to a positioning server according to another embodiment of the present disclosure.

As shown in FIG. 14, a positioning method according to another embodiment of the present disclosure is provided, which is applied to a positioning server. The positioning method includes steps 1401 and 1402.

In step 1401, identification information of a guidepost is received.

In step 1402, a guidepost library is searched according to the identification information of the guidepost, and guidepost location information of the guidepost found in the guidepost library is sent.

In this embodiment, when a GPS is unavailable or comes across an error, the guidepost location information may be obtained through the positioning server, which improves a positioning accuracy.

In an implementation manner, the method further includes following steps: a life cycle of each guidepost in the guidepost library is set; and a guidepost that is not updated within a life cycle and reaches an upper limit of the life cycle is deleted.

In this embodiment, the life cycle of the guidepost is set, which can solve the case where the guidepost is replaced or the location of the guidepost is moved due to road construction or relocation.

Figure 15:
FIG. 15 is a schematic diagram illustrating composition of a positioning server according to an embodiment of the present disclosure.

As shown in FIG. 15, a positioning server according to an embodiment of the present disclosure is provided and includes a guidepost processing unit 1501 and a second communication unit 1502.

In an embodiment, the second communication unit 1502 is configured to receive current location information.

The guidepost processing unit 1501 is configured to search a guidepost library according to the current location information.

The second communication unit 1502 is further configured to send identification information of a guidepost and guidepost location information of the guidepost, where the guidepost is found by the guidepost processing unit and matches with the current location information.

In this embodiment, guidepost information may be provided to a positioning device by searching the guidepost library, so as to improve a positioning accuracy.

The guidepost processing unit 1501 may be implemented by a processor, and the second communication unit 1502 may be implemented by a radio frequency module.

In an implementation manner, the second communication unit 1502 is further configured to receive corrected guidepost location information; and the guidepost processing unit 1501 is further configured to update the guidepost location information of the guidepost in the guidepost library according to the corrected guidepost location information.

In this embodiment, the positioning server receives the corrected guidepost location information and integrates multiple pieces of reported guidepost information, which can improve an accuracy of the guidepost.

In an implementation manner, the second communication unit 1502 is further configured to receive current time information corresponding to the corrected guidepost location information; and the guidepost processing unit 1501 is further configured to store the current time information into the guidepost library.

In an implementation manner, the guidepost processing unit 1501 is further configured to set a life cycle of each guidepost in the guidepost library, and delete a guidepost that is not updated within a life cycle and reaches an upper limit of the life cycle.

In this embodiment, the life cycle of the guidepost is set, which can solve the case where the guidepost is replaced or the location of guidepost is moved due to road construction or relocation.

In another embodiment, the second communication unit 1502 is configured to receive identification information of a guidepost and guidepost location information of the guidepost; and the guidepost processing unit 1501 is configured to search a guidepost library for the guidepost according to the identification information, if the guidepost exists in the guidepost library, update guidepost location information stored in the guidepost library according to the received guidepost location information, and if the guidepost does not exist in the guidepost library, store the identification information of the guidepost and the guidepost location information of the guidepost into the guidepost library.

In this embodiment, the positioning server receives guidepost information and stores the guidepost information into the guidepost library, and may further integrate multiple pieces of reported guidepost location information, so as to improve an accuracy of the guidepost.

In an implementation manner, the guidepost processing unit 1501 is further configured to set a life cycle of each guidepost in the guidepost library, and delete a guidepost that is not updated within a life cycle and reaches an upper limit of the life cycle.

In this embodiment, the life cycle of the guidepost is set, which can solve the case where the guidepost is replaced or the location of the guidepost is moved due to road construction or relocation.

In another embodiment, the second communication unit 1502 is configured to receive identification information of a guidepost.

The guidepost processing unit 1501 is configured to search a guidepost library according to the identification information of the guidepost.

The second communication unit 1502 is further configured to send guidepost location information of the guidepost found by the guidepost processing unit.

In this embodiment, when a GPS is unavailable or comes across an error, the guidepost location information may be obtained through the positioning server, which improves a positioning accuracy.

The guidepost library may store preset guidepost information and guidepost information reported by the positioning device. The guidepost information includes the identification information of the guidepost and the guidepost location information of the guidepost, and may further include a location accuracy estimate of the guidepost. The positioning server may collect the guidepost information reported by multiple positioning devices. The guidepost processing unit retrieves whether the same guidepost exists in the guidepost library, and when determining that the same guidepost exists, integrates related information once and optimizes the accuracy of the guidepost. A guidepost integration algorithm may still adopt a non-linear optimization technology. Observations of the same guidepost reported by multiple positioning devices may be optimized, and guidepost location information with higher accuracy may be obtained. Meanwhile, the positioning server may further respond to a guidepost request of the positioning device. The positioning server sends information on a guidepost near a location to the positioning device according to information on the location sent by the positioning device.

Several application examples are described below.

In an operation process, a positioning device continuously sends its own location to a positioning server to request guidepost location information. At an initial stage of system operation, the positioning server has no guidepost information of the location, and the positioning device may merely perform positioning according to its own information and reports a calculated guidepost to the positioning server. After a period of system operation, the positioning server may find, according to a location reported by the positioning device, information on a guidepost near the location, and the positioning server sends the information to the positioning device for auxiliary positioning.

Application Example One

Figure 16:
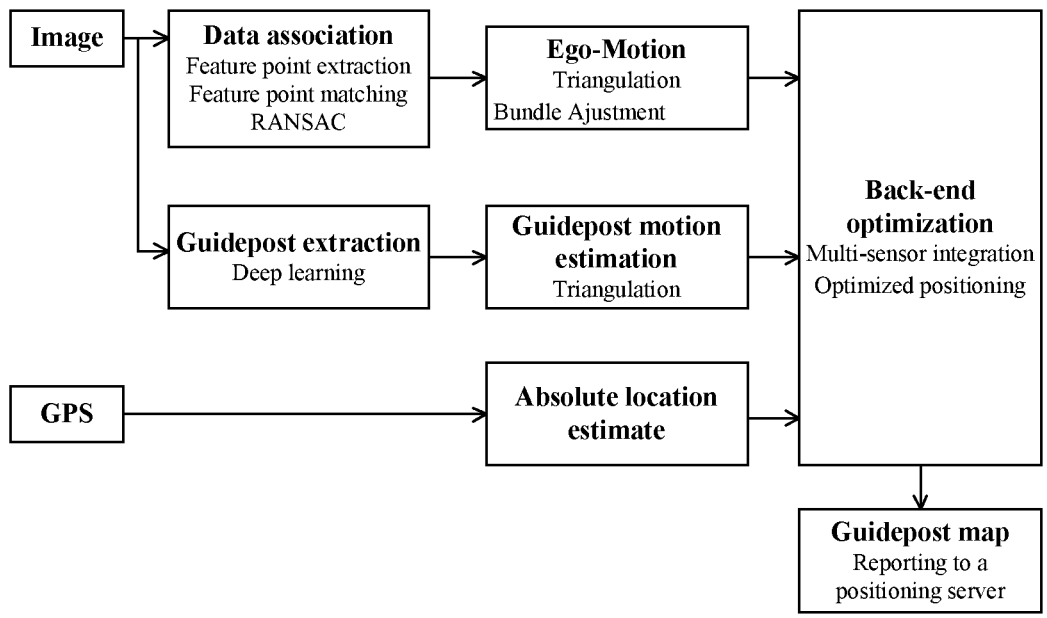
FIG. 16 is a schematic diagram illustrating a positioning implementation in an application example one according to an embodiment of the present disclosure.

At the initial stage of system operation, the positioning server has no guidepost information. In this case, the positioning device positions itself and sends a calculated guidepost location to the positioning server, as shown in FIG. 16. This case corresponds to the second case described above. Since a guidepost library in the positioning server may pre-store some guidepost information, this case does not necessarily occur.

Assuming that a vehicle A1 is equipped with the positioning device, when the vehicle A1 travels in a certain region, the vehicle A1 reports its current location information to the positioning server, but cannot obtain any guidepost information from the positioning server. The vehicle A1 calculates its current location information P1 by integrating visual positioning and a GPS, and meanwhile, the vehicle A1 obtains a traffic sign X1 from the image and estimates an error estimate X1E1 of the traffic sign X1 and a location X1P1 of the traffic sign X1. The positioning device sends the traffic sign X1 as a guidepost to the positioning server, and simultaneously reports the location information X1P1 and the error estimate X1E1 of the traffic sign X1 to the positioning server. The positioning server stores the traffic sign X1, the location information X1P1 and the error estimate X1E1 of the traffic sign X1.

At another moment, a vehicle A2 equipped with the positioning device also travels in this region, calculates its location as P2, observes the traffic sign X1, and estimates a location estimate X1P2 and an error estimate X1E2 of the traffic sign X1. The vehicle A2 also sends the traffic sign X1, location estimate X1P2 and the error estimate X1E2 of the traffic sign X1 to the positioning server.

The positioning server receives guidepost information reported by the positioning device, searches the guidepost library according to guidepost location information and identification information, and integrates information reported by multiple positioning devices after a matching guidepost is found. As described above, the traffic sign X1 has two records: one is the location estimate X1P1 and the error estimate X1E1 reported by the vehicle A1, and the other is the location estimate X1P2 and the error estimate X1E2 reported by the vehicle A2, which are optimized through non-linear optimization and alignment. The optimized location estimate of the traffic sign X1 is X1P, and the optimized error estimate is X1E. It can be known that X1E<X1E1 and X1E<X1E2. When X1E is less than a certain threshold, the guidepost X1 is considered usable.

When the guidepost is initially established, an error of the guidepost is X1E1 by merely depending on location information of the GPS and an image positioning and estimation algorithm of the single positioning device. After the positioning server integrates information reported by other vehicles, the error becomes X1E. As a result, X1E<X1E1. The error of X1 is reported again to be X1E3 by a vehicle A3, and the error of X1 is to be X1E' after integration again. It can be obtained that X1E'<X1E. It can be seen that as X1 is updated through more vehicles, the error of the guidepost X1 will be continuously optimized, and a location of a vehicle that uses the guidepost X1 for positioning is also be continuously optimized.

Application Example Two

Figure 17:
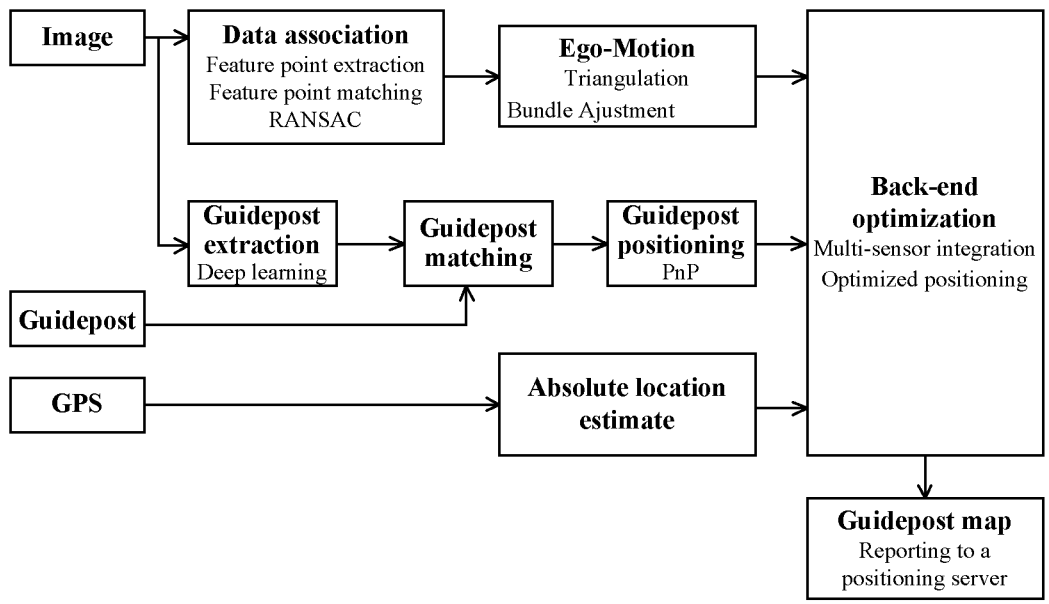
FIG. 17 is a schematic diagram illustrating a positioning implementation in an application example two according to an embodiment of the present disclosure.

In an operation process, the positioning device continuously sends its location to the positioning server. The positioning server sends information on a guidepost near the location to the positioning device. The positioning device first matches guidepost information sent by the positioning server. If matching succeeds, absolute location information of the guidepost may be used for auxiliary positioning, and meanwhile corrected guidepost location information is sent to the positioning server again, as shown in FIG. 17. This case corresponds to the first case described above.

When a vehicle A3 equipped with the positioning device moves near a location of a guidepost X1, the positioning device sends a current location P3 to the positioning server. The positioning server will search the guidepost library for a guidepost near the location and finds that the guidepost X1 is usable. The positioning server sends X1, location information X1P and an error estimate X1E of X1 to the vehicle A3. The positioning device of the vehicle A3 continuously extracts traffic signs from an image to match with X1. If matching succeeds, the positioning device may position the current location of the vehicle A3 through the location information of X1, and perform integration by combining a GPS with a visual positioning algorithm, so as to obtain an optimized current location P3' of the vehicle. The error of the optimized P3' is less than P3. Meanwhile, the vehicle A3 also reports a location estimate X1P3 and an error estimate X1E3 of the guidepost X1 to the positioning server for further integration. It can be seen from the above process that the location of the vehicle A3 changes from P3 to P3' after auxiliary positioning through the guidepost X1, and an accuracy is optimized.

Application Example Three

Corresponding to the third case described above, when a GPS is unavailable or comes across an error, a loop may be performed by detecting a guidepost to correct current wrong location information. If a vehicle A1 calculates a current location as P1 under assistance of the GPS, the positioning server sends guideposts X1 and X2 near P1 to the vehicle A1. However, the vehicle A1 cannot observe the guideposts at the current location and detects other guideposts X3 and X4. The positioning server receives X3 and X4, searches the guidepost library for X3 and X4 for performing the loop detection, and positions the location of the vehicle A1 again.

It should be noted that the GPS is used as a satellite positioning system in the application examples described above, which is not limited in the embodiments of the present disclosure. The present disclosure may also be implemented by using another third-party positioning system.

An embodiment of the present disclosure further provides a computer-readable storage medium, storing computer-executable instructions configured to execute the positioning method shown in FIGS. 3 to 6.

An embodiment of the present disclosure further provides a computer-readable storage medium, storing computer-executable instructions configured to execute the positioning method shown in FIGS. 7 to 9.

An embodiment of the present disclosure further provides a computer-readable storage medium, storing computer-executable instructions configured to execute the positioning method shown in FIGS. 12 to 14.

In this embodiment, the storage medium may include, but is not limited to, a Universal Serial Bus (USB) flash disk, a read-only memory (ROM), a random access memory (RAM), a mobile hard disk, a magnetic disk, an optical disk or other media capable of storing program codes.

Apparently, it should be understood by those skilled in the art that the above-mentioned modules or steps in the embodiments of the present disclosure may be implemented by a general-purpose computing device, the modules or steps may be concentrated on a single computing device or distributed on a network composed of multiple computing devices. Alternatively, the modules or steps may be implemented by program codes executable by the computing device, so that the modules or steps may be stored in a storage device and executed by the computing device. In some circumstances, the shown or described steps may be executed in sequences different from those described herein, or the modules or steps may be made into integrated circuit modules separately, or multiple modules or steps therein may be made into a single integrated circuit module for implementation. In this way, the embodiments of the present disclosure are not limited to any particular combination of hardware and software.

What is claimed is:

1. A positioning method, applied to a first positioning device, comprising:

determining current location information, and sending the current location information to a positioning server;

receiving identification information of a guidepost and guidepost location information of the guidepost sent by the positioning server; and acquiring an image of a current location, matching the image with the identification information of the guidepost, and in response to a success in matching the image with the identification information of the guidepost, obtaining corrected current location information according to (i) the guidepost location information or (ii) the current location information and the guidepost location information;

wherein after the success in matching the image with the identification information of the guidepost, the method further comprises: determining a relative location between the current location and the guidepost; obtaining the corrected guidepost location information according to the relative location and the corrected current location information; and sending the corrected guidepost location information and current time information corresponding to the corrected guidepost location information to the positioning server.

2. The method of claim 1, wherein determining the current location information comprises:
acquiring location information sent by a satellite positioning system as the current location information; or
acquiring location information sent by a satellite positioning system, and determining the current location information by combining visual positioning information with the location information sent by the satellite positioning system.

3. The method of claim 1, wherein obtaining the corrected current location information according to (i) the guidepost location information comprises:
determining a relative location between the current location and the guidepost, and obtaining the corrected current location information according to the relative location and the guidepost location information.

4. The method of claim 3, wherein determining the relative location between the current location and the guidepost comprises:
acquiring depth information of images of the current location and a location change relation of the images, and obtaining the relative location between the current location and the guidepost according to the depth information and the location change relation.

5. The method of claim 1, wherein obtaining the corrected current location information according to (ii) the current location information and the guidepost location information comprises:
determining a relative location between the current location and the guidepost, determining current estimated location information according to the relative location and the guidepost location information, and obtaining the corrected current location information according to the current location information and the current estimated location information.

6. A first positioning device, comprising a processor and a memory in communication with the processor, wherein the memory stores programs, and the programs are operable, when executed by the processor, to perform the positioning method of claim 1.

7. A computer-readable storage medium, storing computer-executable instructions configured to perform the positioning method of claim 1.

8. A positioning method, applied to a positioning server, comprising:
receiving, from a first positioning device, current location information of the first positioning device; and
searching a guidepost library according to the current location information of the first positioning device, and sending to the first positioning device identification information of a guidepost and guidepost location information of the guidepost, wherein the guidepost is found in the guidepost library and matches with the current location information of the first positioning device;
receiving corrected guidepost location information and current time information corresponding to the corrected guidepost location information from the first positioning device; and
updating the guidepost location information of the guidepost in the guidepost library according to the corrected guidepost location information; and
storing the current time information into the guidepost library.

9. The method of claim 8, before receiving current location information of the first positioning device, further comprising:
at an initial stage of system operation, in response to determining that the guidepost library comprises no identification information of the guidepost and the guidepost location information of the guidepost, receiving, from a second positioning device, the identification information of the guidepost and the guidepost location information of the guidepost, wherein the first positioning device is the same as or different from the second positioning device; and
searching the guidepost library for the guidepost according to the identification information of the guidepost, and in response to determining that the guidepost does not exist in the guidepost library, storing the identification information of the guidepost and the guidepost location information of the guidepost into the guidepost library.

10. The method of claim 9, wherein in the step of searching the guidepost library for the guidepost according to the identification information, in response to determining that the guidepost exists in the guidepost library, the method further comprises:
updating guidepost location information stored in the guidepost library according to the received guidepost location information.

11. The method of claim 8, further comprising:
setting a life cycle of each guidepost in the guidepost library; and
deleting a guidepost that is not updated within a life cycle of the guidepost and reaches an upper limit of the life cycle of the guidepost.

12. A positioning server, comprising a processor and a memory in communication with the processor, wherein the memory stores programs, and the programs are operable, when executed by the processor, to perform the positioning method of claim 8.

13. A positioning system, comprising the first positioning device of claim 6 and the positioning server of claim 12.

14. A computer-readable storage medium, storing computer-executable instructions configured to perform the positioning method of claim 8.

* * * * *